March 15, 1938.  F. Q. RAST  2,111,127

WEIGHING AND INDICATING MECHANISM

Filed May 7, 1935  4 Sheets-Sheet 1

INVENTOR
Frederick Q. Rast
BY
W. Wilson
ATTORNEY

Patented Mar. 15, 1938

2,111,127

UNITED STATES PATENT OFFICE 2,111,127

WEIGHING AND INDICATING MECHANISM

Frederick Q. Rast, Binghamton, N. Y., assignor to International Business Machines Corporation, New York, N. Y., a corporation of New York Application May 7, 1935, Serial No. 20,138

11 Claims. (Cl. 265—5)

This case relates to a scale with weight recording, indicating, exhibiting, or manifesting means.

The object is to provide simple means to obtain a value manifestation or record in a lower order denomination of a load value without directly setting such means by the load force.

More specifically, the above object is to provide means for obtaining fractional pound readings, preferably in ounces, without direct setting by the load force.

Further, the object is to lock a load set member and by such locking to set a value manifesting means mounted for movement independently of the load set member.

Still further, the object is to set a load responsive member in an even load position and by such action to set a fraction load value manifesting means.

The object is also to effect the load setting of a higher order value manifesting means while it is free of means to supplement the load setting and to then operate the latter means to secondarily set the higher order manifesting means at an integral load position and by so doing set a lower order or lower orders of value manifesting means.

Other objects will appear from the following parts of the description and from the drawings.

Figure 1:
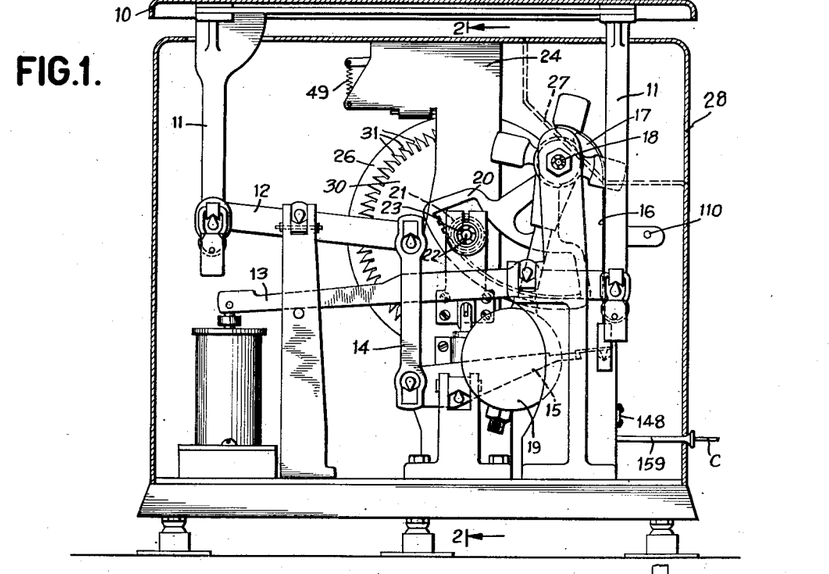
Fig. 1 is a vertical end section through one end of the machine.

The weighing means comprises platform 10 legs 11 of which are supported by first principle base levers 12 and 13. Lever 12 is connected at the power end to link 14, actuating a third lever 15. The power end of lever 15 is connected by tape 16 to a sector 17 on shaft 18 carrying pendulum 19 and rack sector 20. Sector 20 meshes with pinion 21 on weight shaft 22 to rotate the latter clockwise (as viewed in Fig. 1) or counterclockwise (as viewed in Figs. 3 and 4) when a load is applied to the platform.

Figure 2:
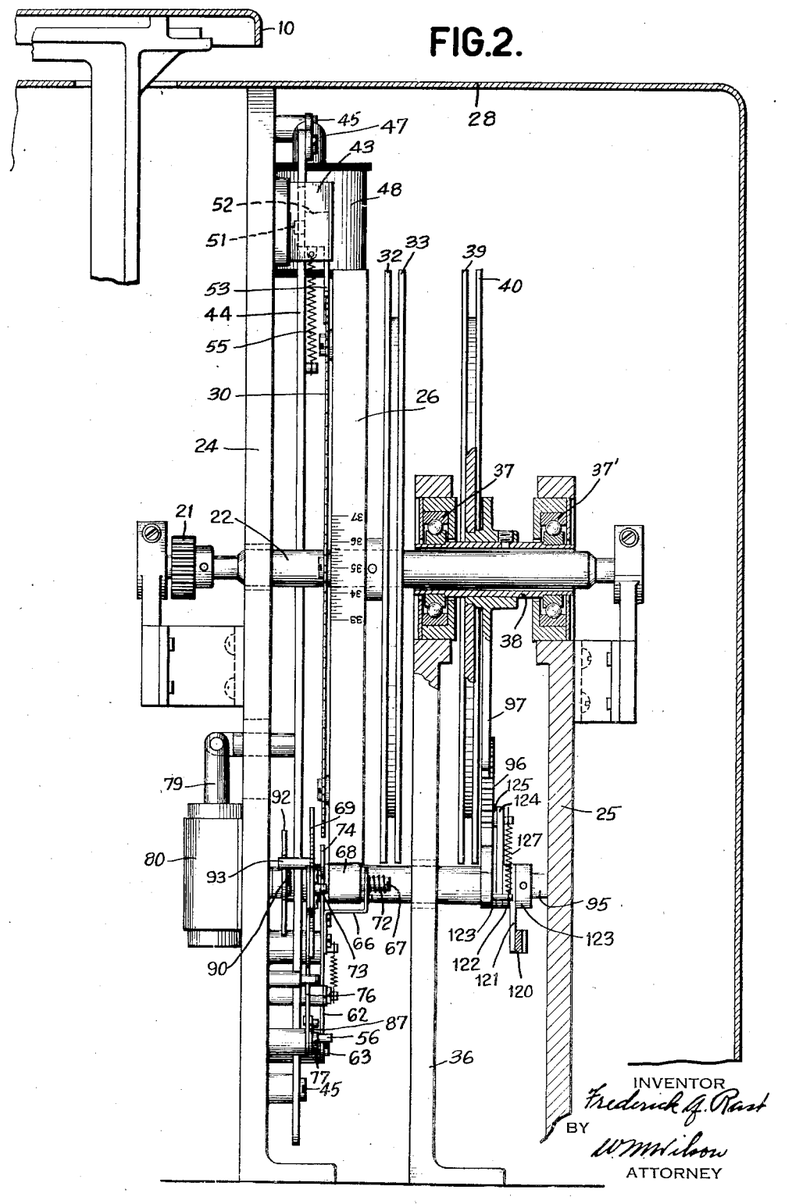
Fig. 2 is a section along line 2—2 of Fig. 1.

As indicated in Fig. 2, shaft 22 extends to the right of platform 10 and is journaled at opposite ends in bearings carried by frame plates or standards 24 and 25. Shaft 22 carries cup-shaped chart 26, the rim of which is graduated in pounds and ounces, with the pound graduations marked by the corresponding figures. The chart is viewed through sight window 27 (Fig. 3) in the front of casing 28 and indexed by sight line 29.

For purposes of the disclosure, it will be assumed the scale has a capacity of 0 to 69 pounds, making seventy pound divisions. The left side of chart 26 (as viewed in Fig. 2) rigidly carries notched disk 30 having seventy notches 31, one for each pound graduation of chart 26. At the right of chart 26, its shaft 22 carries a tens order stepped disk 32 and a units order stepped disk 33. Disk 32 has steps 34 of different radial heights to represent tens of pounds values 0, 1, 2—6. Each step 34 covers a range of ten pound divisions of chart 26. Disk 33 has a series of ten steps 35 each series coextensive with one of the steps 34 of disk 32.

The steps 35 of a series differ in height to represent values 0 to 9 in the units of pounds order and each step covers a single pound division of chart 26. To indicate the value represented by a step 34 or 35, the digit indicating the value will be appended to the common reference character. Thus with a load on the scale of 45 lbs., steps 34—4 and 35—5 will be set in control positions.

Between frames 24 and 25 is a third frame 36 (Fig. 2) with a ball bearing 37 for the left end of a sleeve shaft 38 surrounding but not touching weight shaft 22. The right end of shaft 38 is journaled in bearing 37' carried by frame 25. Operation of shaft 22 under a load has no effect upon shaft 38.

Shaft 38 carries, to the right of disks 32 and 33, the tens order ounce disk 39 and the units order ounce disk 40. The outside peripheries of disks 39 and 40 are each at a radius equal to that of a zero step 34 or 35 and therefore represent zero values in the tens and units ounce orders. Disk 39 has a single step 41—1 representing value 1 in the tens ounce order. Disk 40 has a series of nine steps 42—1, 2, 3,—9 coextensive with an arc of disk 39 just preceding step 41—1. Following the series of nine steps 42—1 to 9, disk 40 has a series of steps 42—0, 1, 2, 3,—6 representing values 0 to 6 in the units ounce order and lying along an arc coextensive with step 41—1 of disk 39. A combination of the disk steps 41 and 42 represents the ounce value of a load. Thus, step 41—0 (the outside periphery of disk 39) and step 42—8 represent 8 ounces, step 41—1 and step 42—0 of the second series represent 10 ounces, and steps 41—1 and 42—3 represent 13 ounces.

When a load is placed on platform 10, the base levers 12, 13, and 15 are rocked to pull down on tape 16 causing gear sector 20 to rock clockwise (Fig. 1) and similarly rock shaft 22 with its chart 26 and stepped disks 32 and 33 according to the load. For example, a load of twenty-five pounds and eight ounces will bring the corresponding 25½ lbs. graduation of chart 26 to sight line 29 and will set a step 34—2 of disk 32 and a step 35—5 of the series of steps of disk 33 coextensive with step 34—2 at control position. Under control of these steps, the tens and units pound order load record will be made, as will be later brought out. In order to control the recording of the ounce value of the load, which in the above example, is 8 ounces, disks 39 and 40 must be set to bring the steps 41—0 and 41—8 to control position. The means for doing this will now be explained.

Figure 3:
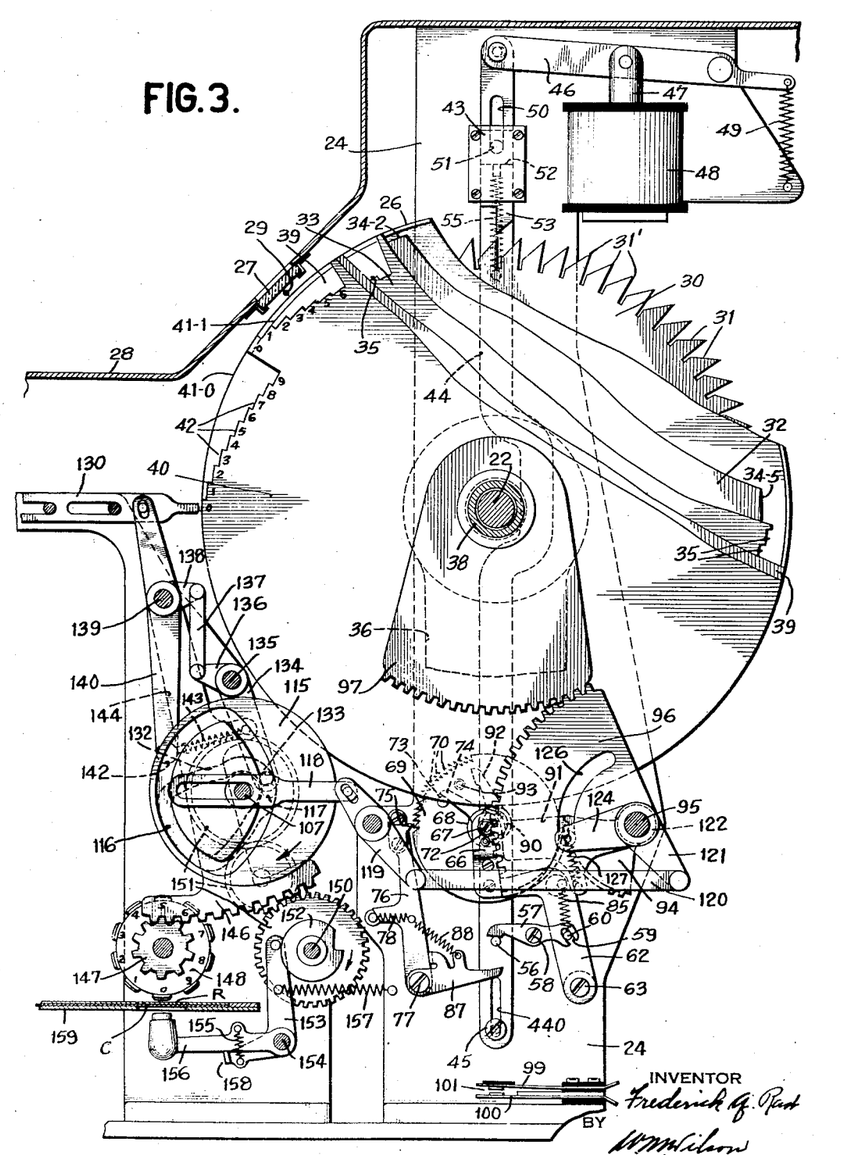
Fig. 3 is an end section through the machine showing the parts in initial positions.
Figure 4:
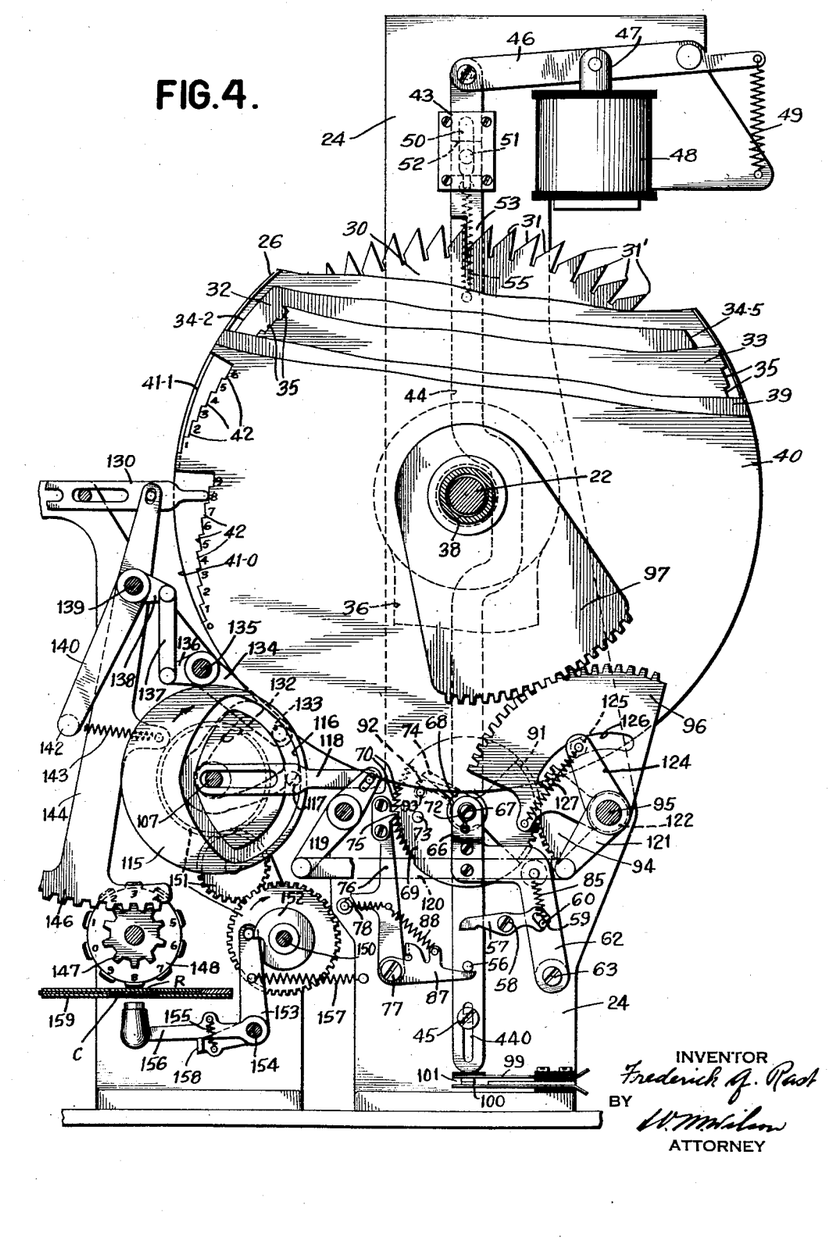
Fig. 4 is a view similar to Fig. 3 but with parts in operated positions.

Referring to Figs. 2, 3, and 4, frame plate 24 has a guide bracket 43 at the upper end for slidably receiving and guiding the upper portion of a control bar 44. The lower portion of bar 44 has a slot 440 slidably coacting with a stud 45 on frame 25.

The upper end of bar 44 is pivoted to a lever 46 which is pinned at an intermediate point to the core 47 of a solenoid 48. A spring 49 connected to lever 46 normally holds core 47 and control bar 44 at their upper limits. The portion of bar 44 passing through guide bracket 43 has a vertical slot 50 receiving pin 51 extending from one side of a slide block 52 slidably mounted within bracket 43. The lower part of block 52 is formed to provide a knife edge tooth 53 which lies along the plane including notched disk 30.

The tooth has a side extending radially of disk 30 and a side inclined to the radial side. Similarly, each notch 31 has a radially directed side and a side inclined thereto. The angle between the sides of a notch is the same as the angle between the sides of tooth 53 and the dimensions of the tooth are such that the tooth will fit snugly in a notch 31. For convenience, the radially directed side of a notch or of tooth 53 may be referred to as the abrupt side while the side inclined to the radially directed side may be referred to as the inclined or cam side of a notch 31 or of tooth 53.

As previously stated, there are seventy notches 31 one for each of pound values 0 to 69. The points of the teeth 31' which form notches 31 are at pound distances apart and each point corresponds to an even pound graduation of chart 26. Further, these points pass the point of knife edge 53 in step with the travel of the corresponding pound graduations past index 29. Since each notch corresponds to a range of one pound, the notch may be considered as divided into sixteen equal divisions, each equivalent to an ounce range of chart 26. If the load on the scale is an even poundage, then the point of a tooth 31' which corresponds to such load value will be exactly opposite the point of tooth 53 and the abrupt sides of tooth 53 and the notch to the right of tooth 53 (Fig. 3) will be in radial alinement. Now, should tooth 53 be moved towards disk 30, the point of the tooth and the point of disk 30 corresponding to the load may engage and stop movement of the tooth. The disk 30 will thereby be locked in an even pound position.

Should the tooth 53 move off the even pound point of disk 30 and into the notch 31 at the right of this point (as viewed in Fig. 3), then the abrupt sides of this notch and of tooth 53 will merely engage along a radial line and as a result, the tooth movement will not effect movement of disk 30 but on the contrary will lock it in its even pound position.

Should the tooth 53 move off the even pound point and into the notch 31 at the left of this point, then the inclined sides of this notch and of tooth 53 will cam against each other as the tooth moves downwardly and as a result, when the tooth has fully and snugly entered this notch, disk 30 will have been moved backwards, in a descending load direction, clockwise (as viewed in Fig. 3) to the extent of a full notch width. This is equivalent to returning disk 30 through a full pound value and thereby subtracting one pound from its primary load setting. However, through means presently to be described, the backward or reverse movement of disk 30 causes corresponding movement of stepped ounce disks 39 and 40 so that if the disk 30 has been reversed a full pound, disks 39 and 40 will be set to read out a value of 16 ounces. Thus, for an even pound load on the scale, the coaction of tooth 53 with disk 30 will in all cases provide accurate load settings of the pounds and ounces orders.

If the load on the scale is a fraction greater than an even poundage, disk 30 will move counterclockwise (Fig. 3) past tooth 53 and the point of a tooth 31' corresponding to the even pound value will be to the left of tooth 53 by an amount equivalent to the fractional value above the even pound value. For example, a load of 25 pounds, 8 ounces will move the point of a tooth 31' corresponding to 25 pounds to the left of tooth 53 by half a notch width or by a distance equivalent to eight ounces. Now, movement of tooth 53 towards disk 30 causes the tooth to enter the notch 31 which corresponds to the pound range above the last even pound point and to cam against the inclined side of this notch to move disk 30 backwards until the tooth is fully seated in the notch. As a result of this cam action, disk 30 will have been set back half a tooth notch distance or through an angle equivalent to eight ounces. The reverse movement of disk 30 is proportionally transmitted to stepped disks 39 and 40 to bring their steps 41—0 and 42—8 to control position. Further, as a result of the action of tooth 53, disk 30 is locked in an even pound position equivalent to the load less the fractional value.

The means for transmitting reverse movement of disk 30 to the ounce disks 39 and 40 will now be described.

Control bar 44, as previously explained has a vertical slot 50 receiving a pin 51 extending from block 52 which is formed with tooth 53. Connecting bar 44 with block 52 is a spring 55 normally holding the block in its lowest position on bar 44, this position being determined by engagement of pin 51 with the lower end of slot 50, as indicated in Fig. 3. Bar 44 is normally held by spring 49 at its upper limit and bar 44 through engagement of the lower end of its slot 50 with pin 51 of block 52 is normally holding the block at its upper limit position. In this position of block 52, the point of tooth 53 is free of and above the disk 30.

Further, in the upper position of bar 44, a pin 56 near its lower end is engaged with one end of a lever 57 and holding the latter at its clockwise limit (Fig. 3). Lever 57 is pivoted on pin 58 carried by frame plate 24 and has a slot 59 engaged by a pin 60 extending from the side of a plate or arm 62 which is pivoted at its lower end on stud 63 fixed to frame plate 24. Rigidly secured to the side of plate 62 is an angle plate 66 (see Figs. 2, 3, and 4). Journaled between plates 62 and 66 is shaft 67 of a small, rubber-covered, friction roller 68 which is in front of the rim of chart 26.

When control bar 44 is in upper, normal, position, tooth 53 is clear of disk 30 and pin 56 is engaging lever 57 to hold the latter in its clockwise position. In this position of lever 57, its notch 59 cams against pin 60 to hold arm 62 at its counterclockwise limit and as shown in Fig. 3, the arm 62 when thus set maintains roller 68 clear of and out of contact with the rim of chart 26. While these parts 44, 57, 62, and 68 are thus in home positions, the load acts on chart 26 to set it without interference from roller 68.

Fast to the left end of shaft 67 of roller 68 (as viewed in Fig. 2) is a disk 69 having seventeen notches 70 which correspond in clockwise order (Figs. 3 and 4) to 0 to 16 ounces. On the right hand end of shaft 67 (as seen in Fig. 2) is wound a fine clock spring 72 connected at opposite ends to shaft 67 and plate 66 to normally, though lightly, urge shaft 67 and its roller 68 in a clockwise direction (Figs. 3 and 4). The clockwise movement of shaft 67 under the influence of spring 72 is limited by engagement of a pin 73 extending from the right side of notched disk 69 on shaft 67 (see Fig. 2) with a finger 74 rigidly projecting from the upper, free end of plate 62. When pin 73 and finger 74 are engaged, disk 69 is in zero position.

At the left of disk 69 (as viewed in Figs. 3 and 4) is a pawl tooth 75 carried by an arm 76 pivoted to frame stud 77. A spring 78 normally holds arm 76 and its pawl tooth 75 free of disk 69.

Control bar 44 is connected to a plunger 79 of a dash pot 80 adapted to dampen the downward movement of bar 44 and to cause this movement to be uniform. The dash pot also serves to effectively time the down stroke of the control bar.

Figures 5, 6, 7:
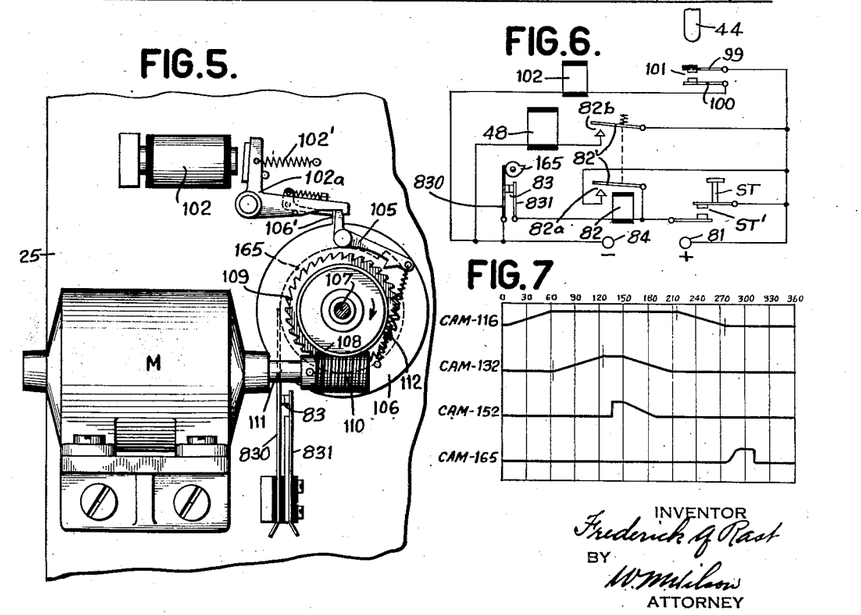
Fig. 5 shows the operating motor and clutch control.
Fig. 6 is the circuit diagram.
Fig. 7 is the timing diagram.

After chart 26 has been set in direct response to a load on the scale, the operator depresses a start key ST to close starting contacts ST' forming the following circuit (see Fig. 6):

From + terminal 81, through starting contacts ST', through magnet 82, and normally closed cam contacts 83 to the − terminal 84.

Above circuit energizes magnet 82 to attract armature 82' to close contacts 82a thereby shunting starting contacts ST'. The circuit will now remain energized as long as cam contacts 83 are closed.

Armature 82' as diagrammatically shown in Fig. 6 not only closes contacts 82a but also simultaneously closes parallel contacts 82b. Closing of contacts 82b connects solenoid 48 across the + and − sides of the line and as a result, the solenoid is energized. The solenoid thereupon depresses its core 47 to rock lever 46 downwardly against resistance of spring 49 and to move control bar 44 through its down stroke. The downward movement of bar 44 is resiliently communicated to block 52 of tooth 53 by means of spring connection 55.

Before the point of the tooth reaches the locus of the points of teeth 31' of disk 30, pin 56 releases lever 57 to permit a light spring 85—connected at the upper end to the frame 24 and at the lower end to pin 60—to rock arm 62 clockwise from the position shown in Fig. 3 to that shown in Fig. 4. A very slight amount of clockwise movement of arm 62 is sufficient to bring the periphery of roller 68 into engagement with the rim of chart 26. The spring 85 at the end of this clockwise movement of arm 62 extends in radial line with pin 60 and pivot 63 of arm 62 so as to exert no turning force on arm 62 and thereby to maintain roller 68 lightly engaged with chart 26.

With roller 68 engaged with chart 26, the lower, zero notch 70 of disk 69 is directly in front of pawl tooth 75. Immediately after engagement of roller 68 with chart 26, the uninterrupted, continued, downward movement of bar 44 begins to move tooth 53 into a notch 31 of disk 30, which is rigidly fastened to chart 26. As previously explained, the movement of tooth 53 into a notch 31 sets disk 30 back to the even pound load position and locks it in the latter position, meanwhile moving disk 30 clockwise (Figs. 3 and 4) to subtract the fractional pound value of the load from the load responsive setting of disk 30. As a result of the setting of disk 30, chart 26 is also returned an amount corresponding to the fractional pound value of the load. The chart 26 at the end of this return movement will have its even pound graduation directly at index line 29.

Since roller 68 was engaged with chart 26 before the chart return movement was begun, the roller 68 will be frictionally rotated counterclockwise (Fig. 4) by chart 26 in proportion to reverse movement of the chart. For each ounce return movement of chart 26, roller 68 is rotated through an angle covered by a tooth notch 70 of disk 69. Thus, for an eight ounce return of chart 26, roller 68, its shaft 67, and disk 69 are rotated counterclockwise through an angle covered by eight notches 70 of disk 69. Thus, each notch 70 is equivalent to an ounce load value. Initially, and before return movement of chart 26 begins and with roller 68 engaged with the chart, the pawl nose 75 is in line with the center of the lowest, or zero notch 70. Should chart 26 now be returned less than half an ounce distance, the zero notch 70 will not have moved past pawl nose 75 and consequently when the latter is moved towards disk 69, it will seat in the zero notch 70 and lock disk 69 in its zero position. Should chart 26 be returned more than half an ounce distance, zero notch 70 will pass pawl 75 and the next, one ounce notch 70 will lie in the path of movement of pawl 75. Thus, the notches are arranged to pass pawl 75 at the half-ounce load values. For example, 1⅝ ounces above an even pound load will bring the 2 ounce notch 70 in line with pawl 75 while 1⅜ ounces will bring the 1 ounce notch 70 in line with pawl 75. Should the ounce value be exactly ½, then the point of pawl 75 will contact a point of disk 69 and effectively lock the latter in its half-ounce position. Should, however, the point of the pawl pass the point of disk 69 and move into the notch 70 at either side of this point, the maximum error will be plus or minus one-half an ounce.

As indicated in Fig. 4, disk 30 and chart 26 are locked by tooth 53 in an even pound position after an eight ounce return movement of chart 26. As a result of the return of chart 26, roller 68 and disk 69 have been rocked counterclockwise through an angle spanned by eight notches 70, thereby bringing the ninth notch 70 which represents an 8 ounce value into line with pawl 75.

Now tooth 53 is fully seated in a notch 31 of disk 30 and its downward movement is thus arrested. Control bar 44 however continues its down stroke and stretches spring 55 between the bar and tooth 53. The first part of the downward movement of bar 44 after tooth 53 has been fully seated in a notch 31 engages the pin 56 with an arm 87 pivoted on frame stud 77 and rocks the arm clockwise. Through a spring 88, the clockwise movement of arm 87 is resiliently transmitted to arm 76 thus bringing pawl 75 into locking engagement with 8 ounce notch 70. Disk 69 is now locked in a differential position corresponding to the fractional load value. Operating under control of disk 69 are means to correspondingly set ounce disks 39 and 40, as will now be explained.

Frame 24 has a stud 90 which is to the left of shaft 67 of roler 68 (as viewed in Fig. 2). When roller 68 is engaged with chart 26, stud 90 and shaft 67 are in axial alinement. Rotatably mounted on stud 90 is a gear sector 91 integrally provided opposite the gear teeth with a finger 92. Finger 92 is adapted to engage a pin 93 extending from the left side of disk 69 (see Fig. 2).

When roller 68 is moved into engagement with chart 26 and disk 69 is still in zero position, pin 93 is engaged by finger 92. This is the home position of the finger and of its associated parts. After disk 69 is moved counterclockwise to an ounce setting, then by means to be described later, the finger 93 is moved in the same direction to engage pin 92 and be stopped thereby in a position corresponding to that of disk 69.

Gear sector 91 is meshed with a gear sector 94 fast to the left end of a shaft 95 which at the right end (as viewed in Fig. 2) rigidly carries a larger gear sector 96. Gear sector 96 in turn meshes with a gear sector 97 fast to sleeve shaft 38 and ounce disks 39 and 40. Thus, as finger 92 of gear sector 91 moves from its initial, home, or zero position to engage pin 93 of disk 69, gear sectors 92, 94, 96, and 97 move through angles proportional to the ounce setting of disk 69 and therefore corresponding to the fractional load value. As a result, shaft 38 and its ounce disks 39 and 40 are set with the steps 41 and 42 representing the ounce values at the control position. Fig. 4 indicates the positions of disks 39 and 40 at the end of their setting according to an eight ounce value. A step 41—0 and a step 42—8 are in control position.

The movement of gear sector 91—and therefore of the elements 92, 94, 95, 96, 97, 38, 39, and 40—under control of disk 69 is governed as follows:

Immediately after bar 40 through its pin 56 has caused the locking by pawl 75 of disk 69, the lower end of the bar engages the upper one of a pair of spring blades 99 and 100 to close switch 101, the points of which are carried by the spring blades. Referring to Fig. 6, closing of switch 101 establishes the following circuit:

*Circuit A.*—From + terminal 81, through switch 101 and clutch magnet 102 to — terminal 84.

The above circuit energizes magnet 102. Referring to Fig 5, magnet 102 when energized rocks latch lever 102a counterclockwise to release a clutch pawl 105. The pawl is carried by a disk 106 rigidly carried by a shaft 107 journaled between frame plates 24 and 25.

Rotatably carried by shaft 107 at one side of disk 106 are the rigidly conected worm gear 108 and ratchet disk 109. Gear 108 meshes with worm 110 on shaft 111 of motor M. Motor M is set in operation at the beginning of a series of weighing and recording operations and may be considered as in continuous operation. Accordingly, ratchet disk 109 is continuously rotating. Now when latch 102a is released by magnet 102 from clutch pawl 105, a spring 112 moves the pawl tooth into engagement with the teeth of ratchet disk 109 causing the latter to impart rotation to disk 106 and its shaft 107.

Referring to Figs. 3 and 4, shaft 107 has a box cam disk 115 formed at one side with cam groove 116. Riding in groove 116 is a follower pin 117 extending from the side of a link 118 which is slotted at the left end to receive shaft 107 and pivoted at the other end to a lever 119. Lever 119 is connected by a link 120 to an arm 121 rigidly carried by a sleeve 122 rotatably mounted on shaft 95 and held in place against movement along shaft 95 by opposite bushings 123 pinned to the shaft (see Fig. 2). Also fast to sleeve 122 is an arm 124 extending oppositely to arm 121. Arm 124 has a stud 125 projecting into an arcuate slot 126 cut in gear 96 and is connected to gear 96 by a light spring 127.

Shaft 107 of cam disk 115 has been set rotating, as previously described. During the first 60° (see the timing diagram, Fig. 7) of the revolution of disk 115, its cam groove 116 coacts with follower pin 117 to move link 118 to the right away from the home position shown in Fig. 3.

As link 118 moves to the right, it rocks lever 119 clockwise and the lever, in turn, through link 120 rocks arm 121 and its sleeve shaft 122 clockwise away from their initial positions shown in Fig. 3. As sleeve shaft 122 rocks clockwise its arm 124 moves in the same direction and through light spring 127 yieldingly draws gear 96 after it. As gear 96 is fast to shaft 95, the latter is also moved clockwise. Gear 94 on the shaft thereupon rocks gear 91 on stub shaft 90 counterclockwise until finger 92 engages pin 93 of locked disk 69. As a result, gears 91, 94, and 96, are stopped after being moved through angles corresponding to the ounce setting of disk 69. Arm 124 which actuated these gears through spring 127 into their differential positions, continues moving to the end of its forward stroke after the gears are arrested under control of disk 69 and spring 127 stretches.

As gear 96 rotated clockwise, it rocked meshed gear 97 and its sleeve shaft 38 counterclockwise to move ounce disks 39 and 40 in the latter direction. Thus, if as previously assumed, disk 69 has been set in an 8 ounce position, then rigidly connected disks 39 and 40 will be moved from their home positions shown in Fig. 3 to the positions shown in Fig. 4.

At this point, all the stepped disks are set in control positions according to the even pounds and fractional pounds of load on the scale. Thus for a load of 25 lbs. 8 ounces, disk 32 has a step 34—2 in control position, disk 33 has a step 35—5 in control position, disk 39 has its step 41—0 in control position, and disk 40 has its step 42—8 in control position.

The control positions of the several stepped disks are the positions which are in line with sensing fingers 130, one for each of the disks. The action of these fingers and the means controlled thereby is similar and therefore only one need be specifically described, the units of ounce sensing finger 130 being selected.

The forward stroke of arm 124 and the setting of ounce disks 39 and 40 are completed at 60° of the revolution of shaft 107. Cam groove 116 has an arcuate portion permitting the arm 124 to dwell at the end of its forward stroke until 215° of the revolution of shaft 107 (see Fig. 7).

Disk 115 is formed at the side opposite groove 116 with another separate box cam groove 132 within which is the follower 133 of an arm 134 secured to a shaft 135 which also has fastened to it an arm 136. Arm 136 is connected by a link 137 to an arm 138 fast to a shaft 139. Shaft 139 rigidly carries bail arms 140 connected at their outer ends by a bail rod 142. Rod 142 is separately connected by individual springs 143 to each of four levers 144 (only one is shown) which are freely pivoted on shaft 139. Each lever 144 is pivotally connected at its upper end to a separate one of the sensing fingers 130.

As indicated by the timing diagram, between 65° and 125° of the revolution of disk 115 and while arm 124 is idling at the end of its forward stroke, cam groove 132 acts on follower 133 to rock arm 134 and its shaft 135 counterclockwise from their home positions shown in Fig. 3. Arm 136 of shaft 135 thereby rocks counterclockwise and through link 137 rocks shaft 139 clockwise. As a result, rod 142 moves clockwise and through springs 143 yieldably moves levers 144 in the same direction. As levers 144 move in this direction, they bring fingers 130 into engagement with the control steps of the disks 32, 33, 39, and 40.

The fingers are stopped in differential positions corresponding to the heights of the steps which are in control positions. When a finger 130 is thus arrested in a differential position, its operating arm 144 is likewise and similarly arrested. Rod 142 however continues to the end of its clockwise stroke and stretches springs 143 after the levers 144 have been arrested. Rod 142 now idles under control of cam groove 132 at the limit of its clockwise stroke until 210° of the cycle.

Each lever 144 is formed at its lower end with teeth 146 meshed with a pinion 147 of a type wheel 148. When lever 144 is set in differential position, through teeth 146 it rotates pinion 147 and type wheel 148 to bring into printing position that type lug intended for printing the digit represented by the differential position of lever 144. Since this differential position is determined by the step engaged by finger 130, it is evident that each type wheel 148 is set to print the value corresponding to the height of the control step. Thus, the units ounce order type wheel 148 is set to print 8 under control of step 42—8 of disk 40, as shown in Fig. 4.

For a load of 25 lbs. 8 ounces, the tens and units disks 32 and 33 will respectively control their sensing fingers 130 and connected levers 144 to set the tens lbs. order and the units lbs. order type wheels to print 2 and 5, respectively while disks 39 and 40 will respectively set their associated tens of ounces and units of ounces order type wheels to respectively print 0 and 8.

At 125° (see Fig. 7) of the revolution of shaft 107, all the type wheels 148 have been set according to the load and remain set while rod 142 is idling at the end of its forward stroke until 150° of the cycle. During this idling period, printing takes place. The means for effecting printing comprises a shaft 150 geared one-to-one by gearing 151 to shaft 107. Shaft 150 has a cam 152 coacting with follower lever 153 rotatably mounted on a shaft 154. Lever 153 is connected by spring 155 to a hammer 156. At 135° of the cycle, cam 152 permits lever 153 to be rocked clockwise by a spring 157. The lug 158 on lever 153 held engaged with hammer 156 by spring 155 thereupon imparts clockwise movement to the hammer. The drop in cam 152 is such that lever 153 stops clockwise motion before hammer 156 strikes the type lugs of type wheels 148. Due to its momentum, the hammer continues to move further than lever 153 and strikes the type wheels a sharp blow. Between the hammer and type wheels is a card guide or chute 159 in which a card or sheet C is inserted before the weighing operation. Between the card C and type wheels is an inking ribbon R. Thus, the hammer when it strikes the type wheels causes the latter to print the load record on card C.

After the weight record has been made, the parts are ready to be restored.

As indicated in the timing diagram (Fig. 7), the printing operation is completed at about 135° of the cycle. At 150° of the cycle, cam groove 132 functions to move rod 142 counterclockwise and the rod engages the levers 144 to restore them and their connected sensing fingers 130 and type wheels 148 to zero or home positions. The restoration of these parts is completed at 210° of the cycle.

The stepped disks 39 and 40 are now free to be restored. At 215° of the cycle, cam groove 116 functions to cause counterclockwise rocking of arm 124 and its stud 125. As the stud moves counterclockwise, it encounters the lower end wall of slot 126 and positively restores gear 96 and its connected parts 97, 38, 39, 40, 95, 94, 91, and 92 to their home positions. The restoration of the latter parts is completed at 275° of the cycle.

As shown in Fig. 5, shaft 107 has a cam 165 which is engageable with the long blade 830 of contacts 83 to separate it from short blade 831 to thus open contacts 83. As indicated in Fig. 7, between 280° and 285° of the cycle, cam 165 opens contacts 83. This results in breaking the circuit through magnet 82 which thereupon releases its armature 82' to cause contacts 82a and 82b to open. Cam 165 permits contacts 83 to reclose before the end of the cycle of shaft 107 but since contacts 82a are then open, the circuit through magnet 82 cannot be made again except by the closing of starting contacts ST'.

Opening of contacts 82b breaks the circuit through solenoid 48 and control bar 44 starts its return or upward stroke. As bar 44 moves up, it releases blade 99 and switch 101 opens, thereby breaking the circuit through clutch magnet 102. This occurs at about 285° of the single revolution of shaft 107. With clutch magnet 102 now de-energized, spring 102' returns latch 102a to initial position for intercepting the tail of clutch pawl 105. When disk 106 and its shaft 107 have made one revolution, latch 102a engages pawl 105 and rocks it out of engagement with ratchet disk 109, thereby uncoupling shaft 107 from the motor drive. When pawl 105 is engaged by latch 102a, the latter also engages a projection 106' of disk 106 to stop the disk and its shaft 107 in a definite home position after the shaft has made a single revolution.

As bar 44 is now moving up, pin 56 leaves arm 87 permitting springs 88 and 78 to retract lock tooth 75 from the notch 70 of disk 69 engaged by the tooth. During a further part of the return stroke of bar 44, pin 56 engages lever 57 to rock it clockwise (Figs. 3 and 4) causing its slot 59 to cam against pin 60 for rocking arm 62 counterclockwise. This movement of arm 62 withdraws roller 68 from engagement with the rim of chart 26. As bar 44 moved to bring its pin 56 from arm 87 to lever 57, through spring 55 it moved tooth 53 upwardly. Following the point of the return stroke at which roller 68 was disengaged from chart 26, the lower end of slot 50 of bar 44 engaged pin 51 of block 52 of tooth 53 to positively bring tooth 53 clear of disk 30.

The parts are now in their initial positions, indicated in Fig. 3.

*Summary*

A load is placed on platform 10. The weight of the load causes levers 12, 13, and 15 to depress tape 16 to thereby rock pendulum shaft 18 clockwise (Fig. 1) through an arc equivalent to the load. Through gears 20 and 21, shaft 18 similarly rocks weight shaft 22 and its rigidly carried parts, chart 26, tens of pounds stepped disk 32 and units of pounds stepped disk 33.

The operator now depresses start key ST (Fig. 6) to close contacts ST' thereby forming a circuit through magnet 82. Energization of the magnet closes contacts 82a to shunt out the starting contacts ST' and closes contacts 82b to energize solenoid 48. Solenoid 48 now moves control bar 44 through its down stroke.

The initial part of this stroke withdraws pin 56 of bar 44 from lever 57, permitting a light spring 85 to rock the arms 62 and 66 to bring the friction roller 68 carried by the arms from the position shown in Fig. 3 to the position shown in Fig. 4 in which the roller is engaged with the rim of chart 26. The next part of the stroke of bar 44 starts moving tooth 53 into a notch 31 of disk 30 and as the tooth moves into the notch it cams the disk 30 clockwise in a direction reverse to that in which it is moved by the load. When the tooth is seated flush in the notch 31, it has set disk 30 back trough an angle corresponding to the ounces above the even poundage and has locked the disk in such position. As disk 30 is fast to chart 26, the latter and its shaft 22 are correspondingly set back. Stepped disks 32 and 33 are also set back and this results in the central position of a pound step 35 of disk 33 being in front of its sensing finger 130, thus removing the danger of the finger engaging the point of the step 35 and sliding off the point to abut the incorrect tooth.

As chart 26 is set back, it frictionally rotates roller 68 counterclockwise (Figs. 3 and 4) through an angle corresponding to the ounce orders of the load. When the chart 26 has been locked in its even pound position, disk 69 on shaft 67 of roller 68 has a notch 70 corresponding to the ounce load in position to be engaged by a pawl 75. The downward movement of bar 44 continues and pin 56 strikes lever 87 to rock pawl 75 into engagement with the notch 70 of disk 69 which corresponds to the ounce load. At the end of the down stroke of bar 44, it closes switch 101.

When switch 101 closes, clutch magnet 102 is energized to release shaft 107 for a single revolution cycle. Referring to the timing diagram, Fig. 7, between 0 and 60° of this cycle, a cam groove 116 of disk 115 on shaft 107 causes clockwise movement of an arm 124 to move parts 91, 92, 94, 95, 96, 97, 38, 39, and 40 in accordance with the ounce setting of disk 69. A step 41 of disk 39 and a step 42 of disk 40 representing the tens and units ounce orders of the load are now in front of their sensing fingers 130.

Following the setting of disks 39 and 40, a cam groove 132 of disk 115 causes the levers 144 to be differentially positioned under control of the engagement of sensing fingers 130 with the steps 34, 35, 41, and 42 of the tens of pounds disk 32, units of pounds disk 33, tens of ounces disk 39, and units of ounces disk 40.

The levers 144, when differentially positioned, set the printing wheels 148 to print the load values.

At 135° of the cycle, cam 152 causes hammer 156 to strike the type wheels for making a load value imprint on a card C.

Following the printing operation cams 116, 132, and 152 restore their associated parts to initial positions. At 285° of the cycle, cam 165 opens contacts 83 to cause deenergization of solenoid 48 and magnet 82. Solenoid 48 now rises and switch 101 opens and breaks the circuit through clutch magnet 102. Deenergization of magnet 102 results in shaft 107 being stopped after it has made one revolution. As bar 44 moves through its return stroke, the parts directly controlled thereby return to initial positions.

While only a single embodiment of the invention has been disclosed, it is to be understood that any variations, departures, or modifications derived from the principles of the invention are to be considered as within the bounds of the invention which is to be limited only by the scope of the claims.

I claim:

1. In a load weighing scale; the combination of a rotatable disk primarily settable in a load position, means for rotating said disk away from the load position in proportion to a fractional value of the load, a friction wheel frictionally rotated by engagement with the disk during rotation of the disk by said means, and indicating mechanism controlled by the friction wheel for operation according to rotation of the wheel by the disk.

2. In a load weighing scale; the combination of a rotatable disk primarily settable in a load position, means for effecting a secondary setting of the disk to rotate it in proportion to a fractional value of the load, a friction wheel engageable with the rim of the disk to be frictionally rotated thereby during its secondary setting, and indicating mechanism controlled by said friction wheel for operation according to said fractional load value.

3. In a load weighing scale; the combination of a rotatable disk primarily settable in a position corresponding to the load, means to effect a secondary setting of the disk to rotate it away from said load position in proportion to a fractional value of the load, a friction wheel normally free of the disk, means controlled by operation of the first-mentioned means preliminary to effecting said secondary setting operation for engaging said wheel with said disk to thereby cause the disk to frictionally rotate the wheel during the secondary setting operation in accordance with said fractional load value, and indicating mechanism controlled by said wheel according to its rotation.

4. In a load weighing scale; the combination of a rotatably mounted disk responsive to the force of the load to be set thereby in load position, means operable subsequently to load setting of the disk for effecting a secondary setting of the disk by rotating it away from the load position in proportion to a fractional load value, a friction wheel of lesser diameter than the disk, normally free of the disk and movable into engagement with the disk to be frictionally rotated by the latter during its secondary setting through a greater angle than the angle of secondary rotation of the disk, movement multiplying mechanism controlled by the wheel in accordance with rotation of the latter to further multiply the secondary movement of the disk and indicating devices controlled by said mechanism for operation in proportion to said fractional load value.

5. In a load weighing scale; the combination of a member movable proportionally to the load to a position corresponding to whole and fractional values of the load, means to effect a supplementary movement of the member in proportion to the fractional load value, a plurality of elements, one having steps representing the digital values of a lower denominational order of the fractional load value, the other having steps representing the digital values of a higher order of the fractional load value, means controlled by the member in accordance with its secondary movement for commonly actuating said elements to select steps of each representative of the different orders of digits representing the fractional load value, fingers for sensing the heights of the selected steps, and multi-denominational order indicating devices controlled by the fingers to indicate the fractional load value in its several orders.

6. In a weighing scale; the combination of a notched member movable proportionally to the load, a tooth movable into a notch of said member and arranged and constructed to cammingly coact with a wall of said notch during movement into the notch to effect a supplementary movement of the member proportional to a fractional load value, and indicating mechanism controlled by the member according to its supplementary movement to indicate said fractional load value.

7. In a weighing scale; the combination of a rotatable disk movable proportionally to the load and having notches with inclined sides, the width of each notch corresponding to a single preselected unit value of the load, a knife edge shaped to fit into a notch of the disk, means for moving the knife edge into a disk notch to cause the knife edge to cam against the inclined side of the notch and rotate the disk in proportion to a fraction of such unit value, an indicating device, and mechanism controlled by the disk for operating the indicating device in accordance with the extent of rotation of the disk by said knife edge to thereby enter said fractional value of the load unit into the indicating device.

8. The combination as defined in claim 7, the mechanism controlled by the disk including a wheel normally free of the disk, and moved into engagement with the disk under control of aforesaid knife edge operating means, said wheel after engagement with the disk being rotated thereby reversely to rotation of the disk and in proportion to the fractional unit movement of the disk, and means cooperating with the wheel to convert rotation of the latter into equivalent operation of the indicating device.

9. The combination as defined in claim 7, aforesaid mechanism including a cyclically operable actuator, a device controlled by the knife edge operating means for setting said actuator in operation for a single cycle, and means controlled by the actuator for operating said indicating device under control of said disk.

10. In a load weighing scale; a rotatable disk primarily settable in a load position, means for effecting a secondary movement of the disk by rotating it away from the load position in proportion to a fractional value of the load, a wheel of lesser diameter than the disk having peripheral engagement with the disk and rotated by engagement with the disk through a greater angle than the latter during the secondary movement of the latter, and indicating mechanism controlled by the wheel for operation according to the rotation of the wheel by the disk.

11. In a load weighing scale; a rotatable member primarily settable in a load position, means for effecting a secondary movement of the member by rotating it away from the load position in proportion to a fractional value of the load, a rotatable device of lesser radius than the member and having peripheral engagement therewith to be rotated thereby during secondary movement of the member through a greater angle than the latter, and indicating mechanism controlled by the device for operation according to the rotation of the device by the member.

FREDERICK Q. RAST.